United States Patent [19]
Keehn

[11] Patent Number: 5,909,315
[45] Date of Patent: Jun. 1, 1999

[54] DISPLAY FILTER AND BEZEL SECUREMENT APPARATUS

[75] Inventor: Donald L. Keehn, Santa Rosa, Calif.

[73] Assignee: Optical Coating Laboratory, Inc., Santa Rosa, Calif.

[21] Appl. No.: 08/595,927

[22] Filed: Feb. 6, 1996

[51] Int. Cl.$^6$ .................................................. G02B 27/00
[52] U.S. Cl. ........................................ 359/609; 359/601
[58] Field of Search .................... 359/601–610, 359/808–812, 819

[56] References Cited

U.S. PATENT DOCUMENTS

| | | | |
|---|---|---|---|
| 3,329,771 | 7/1967 | Rose | 348/842 |
| 4,864,190 | 9/1989 | Orr | 348/834 |
| 4,865,420 | 9/1989 | Schmidt | 359/601 |
| 5,048,928 | 9/1991 | Davis | 359/601 |
| 5,130,853 | 7/1992 | Sakurai | 359/803 |
| 5,218,474 | 6/1993 | Kirschner | 359/609 |
| 5,448,405 | 9/1995 | Clausen | 359/601 |
| 5,523,890 | 6/1996 | Reaney | 359/819 |
| 5,627,606 | 5/1997 | Pember et al. | 359/609 |

OTHER PUBLICATIONS

Glare/Guard Maximum Anti–Glare Anti–Radiation Filter Flat Frame with Side Mount Hangers Brochure, Nov. 1994.
Glare/Guard Standard Plus Anti–Glare Filter, Wrap–Around Frame Brochure, Nov. 1994.
Glare Defender Anti–Glare Filter Specification Sheet, Feb. 1995.

Primary Examiner—Thong Nguyen
Attorney, Agent, or Firm—Workman, Nydegger & Seeley

[57] ABSTRACT

A display filter having a secure apparatus comprised of spring loaded gripping members for attaching a bezel having a filter medium onto a notebook computer. Gripping members grasp the sides of the notebook computer and the springs exert force sufficient to hold the display filter at a desired location. Further more, the display filter is horizontally adjustable so that the filter medium may be centered over the notebook computer display. When not used on a notebook computer display, the display filter may be stored in a relatively flat form factor by rotating the gripping members such that the protrusions used to grip the side of a notebook computer case may be rotated so that they lay flat against the side of a bezel. In this manner, there are no protruding edges and overall bulk is minimized. Other ways of attachment include the use of L-shaped strip members that are adjustable with respect to the bezel that contain the filter medium. On the extended portion of the L-shaped strip, there is a curved clip-like structure to snap the bezel into place on the notebook computer case and over the notebook computer display. The elongated portion of the L-shaped strip can be adjusted with respect to the bezel holding the filter medium so that when the display filter is attached to the notebook computer case, the filter medium will be centered over the notebook computer display.

16 Claims, 3 Drawing Sheets

DISPLAY FILTER AND BEZEL SECUREMENT APPARATUS

BACKGROUND OF THE INVENTION

1. The Field of the Invention

This invention relates to screen filters and filter bezels for monitors, computer screens, and other visual displays. More particularly, this invention deals with ways of securing screen filters and filter bezels to PC workstation monitors and notebook computer displays.

2. Present State of the Art

Currently there exists a plethora of different viewing devices encountered by many people through all walks of life. These include television screens, computer monitors, ATM machines, some sophisticated copy machines, portable laptop and notebook computer screens, to name just a few. While many of these viewing screens are based on cathode ray tube (CRT) technology, increasingly, use has been made of Liquid Crystal Display (LCD) and gas plasma technologies that advantageously reduce bulk since no tube is required. The newer technologies provide thin, flat screen viewing spaces. This is particularly relevant in applications where portability and light weight are important. Particularly important for purposes of this disclosure are personal computing applications where portable laptop and notebook computers utilize a variety of flat-screen technologies in their screen or monitor systems.

In the personal computer industry, certain problems have been identified with constant and extended viewing of PC monitors and other screens. Some problems associated with extended computer screen viewing include eye strain and headaches, drowsiness, blurred vision, dry and irritated eyes, and a sensitivity to light. These problems are thought to be caused by radiation, ultra-violet (UV) light, infra-red (IR) light, glare, poor contrast, and bothersome reflections. In an attempt to address these problems products have been developed to filter screen output before being perceived by the human eye in an effort to alleviate or eliminate the above-mentioned concerns. Such filters have been known to filter out UV and IR transmissions from a visual screen, as well as to prevent glare and reflection from distorting or otherwise making screen output difficult to view. While plastics, fine screens, and other lightweight materials have been utilized to construct filters to prevent distortions and filter unwanted radiation, it has been found that high-quality optical glass tends to be the most effective. One drawback in the use of such high quality glass filters for portable computing applications is their increased weight and expense.

Other types of filters can be used for privacy. Privacy filters find application in any situation where information security may be compromised. Still other filters are used to enhance contrast of actual screen output. The contrast enhancement is found in many filters and is in part achieved by reducing glare and reflection.

While many filtering solutions exist for desk-top computer monitors, little has been done to address the problems peculiar to portable computers. Among these problems are a requirement for easy portability, the ability to adjust to a number of different display placement configurations within a notebook computer case, and the ability to easily position or remove the filter on the notebook case as desired by the user. It would be desirable to achieve all of these and other objectives in constructing filters and filter securement systems for notebook computers.

Portability is required since a notebook computer is designed to be folded into a, minimal size to travel with the user. Notebook computer manufacturers have so constructed their machines to optimize all possible space in order to make the folded notebook computer form factor as small as possible. Therefore, unlike the situation with desk-top computer monitors where the filter securement assembly may remain relatively permanently affixed to the monitor casing, a portable notebook or laptop user will install the filter assembly or bezel each time the computer is used since there will not normally be room to leave a filter bezel affixed to the notebook display when the notebook computer is folded for storage and travel. Because the filter assembly will be stored separate from the notebook computer, it is necessary for the filter assembly to be durable, compact, and have a minimum of protruding edges when stored for traveling. It must also have a small overall form factor so as to minimize the bulk and awkwardness.

Next, a filter securement assembly must be quick and easy to use. Because a traveller with a notebook computer may be utilizing the computer for presentations or other quick set-up situations, easy-to-use mechanisms for attaching the filter to the notebook screen area are necessary. This can be contrasted with mechanisms used to attach filters to desk-top computer monitors that will remain affixed to the monitor once installed rather than be repeatedly attached and detached each time the computer is used as is the case with notebook and other portable computers.

Finally, a filter assembly for notebook computers must be able to adjust to a number of different display positions that may be found within the notebook computer casing. For example, a display screen may be housed horizontally centered within a notebook casing or it may be offset to one side of the computer housing. Rather than designing a separate filter securement assembly for each model of notebook computer, it is desirable that the filter securement assembly itself be adjustable to the different vertical and horizontal placement possibilities of a notebook computer screen within the notebook. In this way, filters can be produced according to notebook computer display size taking no concern as to actual placement of the display screen with respect to the casing being unimportant.

One known way of attaching a filter to a notebook computer screen utilizes four adhesively applied patches of Velcro, one patch at each corner of the casing around the notebook screen. Mating patches of Velcro are found on a filter bezel holding a filter medium that allows the filter assembly bezel to be placed on the Velcro when desiring to attach it for normal use. This method of securement does not allow a filter to be attached to an unprepared notebook computer but only those computers that have the adhesively applied patches of Velcro previously applied. Further, there may be some notebook computer configuration where the adhesively applied Velcro patches may interfere with closing the notebook computer for storage and traveling.

What is needed is a filtering apparatus for notebook computers that allow quick, easy, and secure placement of a filtering medium over the notebook computer display regardless of where the display is located vertically or horizontally. Furthermore, such securement apparatus must be portable and capable of enduring the rigors of travel.

SUMMARY AND OBJECTS OF THE INVENTION

It is an object of this invention to secure a filter or filter medium bezel to a notebook computer display.

It is a further object of this invention to center a filter or filter medium bezel over a notebook computer display regardless of where vertically or horizontally the display is located with respect to the notebook computer case.

It is another object of this invention to provide a filter or filter medium bezel that can be quickly, easily, and securely attached to a notebook computer display or other display for repeated attachment and detachment according to the needs and desires of a user.

It is yet another object of this invention to provide a filter or filter medium bezel that is portable and able to endure the buffetings of frequent travel.

It is a feature of certain embodiments of this invention to utilize spring-loaded and rotatable clamps to grip the sides of a notebook computer display for securing a filter or filter medium bezel to the display of a notebook computer.

It is another object of this invention to reduce the number of different models a notebook display filter manufacturer must produce in order to cover all the different possible display placement configurations within a notebook computer display casing.

Additional objects and advantages of the invention will be set forth as follows, and in part will be obvious from the description, or may be learned by the practice of the invention. The objects and advantages of the invention may be realized and obtained by means of the instruments and to achieve the foregoing objects, and in accordance with the invention as embodied and broadly described herein a display filter and bezel securement apparatus are provided.

A display filter according to the present invention comprises a form of filter medium to accomplish a specific purpose combined with other means for securing the medium over a screen display. The purpose of the filter medium may be to eliminate UV, IR, and other forms of radiation as well as to enhance screen display contrast. Furthermore, some filter media will reduce glare and unwanted reflections. Additionally, some filter media may combine one or more purposes according to the desired objectives of the filter designer.

The filter medium is contained within a frame, also referred to as a bezel, that will eventually, through securement means, be attached to a notebook computer and centered over the screen display. The bezel or frame may be manufactured such that the medium is permanently affixed therein or allow the filter medium to be changed at will. In this way, a user may change the filter medium to get a desired effect according to particular environmental circumstances. Since filter media can be made available separate from the supporting bezel, efficiencies in manufacturing and enhanced consumer choice are realized.

In one embodiment of the invention, spring-loaded gripping members are found within a housing attached to the filter medium bezel. The spring-loaded arrangement tends to draw each gripping member towards the filter medium bezel with a sufficient amount of force to securely attach the entire display filter on to the notebook computer case. The two gripping members have extended arms or protrusions for grasping the sides of the notebook computer case and their elongated bodies are drawn into and are rotatable within the housing. The housing and elongated bodies of the spring-loaded gripping members are tubular in nature to facilitate such rotation.

To place the notebook display filter onto a notebook computer, a user simply rotates the spring-loaded gripping members so that the protruding edges or protrusions are in an extended position for grasping the sides of the computer case. Next, the user pulls each spring-loaded gripping member away from the housing until the gripping members are positioned beyond the opposing sides of the computer casing. When the user allows the springs to actuate the gripping members and draw them towards the housing, the protruding portion or protrusion of each gripping member will engage the side of the computer case to firmly secure the filter to the notebook computer.

Because the spring-loaded gripping members rotate, the protrusions or extended arms may also be made to lie against the bezel frame so that the entire notebook computer display filter lies flat with no edges to catch during traveling. In this retracted position, the notebook filter display is in the most compact form. This durable design is also economical to manufacture and pleasing to the eye.

Another embodiment of the present invention utilizes flattened L-shaped strip members that are adjustable with respect to the filter medium bezel. The housing to receive the L-shaped strip members has means for selectively allowing an L-shaped strip member to be locked into position with respect to the bezel. The housing may also be directly incorporated within the manufacture of the bezel.

Once the proper adjustment is made so that the filter medium is centered with respect to the notebook computer case and the L-shaped strip members are positioned with protruding extended portion at opposite sides of a notebook computer case, a user simply snaps the display filter onto the case, taking advantage of a curved clip integrated into the L-shaped strip member to provide sufficient force to hold the filter display at the desired location. The clip portion of the L-shaped strip member provides the clamping force that keeps the notebook display filter mounted at the desired location.

Each embodiment, and others that are apparent and obvious from this disclosure, allow a user to center a filter medium bezel about a notebook computer display screen quickly, easily, and securely. Vertical adjustment is typically accomplished by the actual placement of the display filter while horizontal centering is accomplished by adjusting the gripping members in the appropriate manner.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawing depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

While this invention is expressed herein as a filter for a notebook computer display, the invention is applicable to other types of portable displays. Particularly, any display that is folded when set for storage and traveling would find useful applications of the present invention. It is the folding nature of a notebook computer display casing that makes current mounting systems used in connection with desk-top computer monitors impractical and gives rise to the special requirements addressed by the present invention. Any display configuration that will give rise to the same requirements for a display filter as expressed here before will benefit from the present invention.

Figure 1:
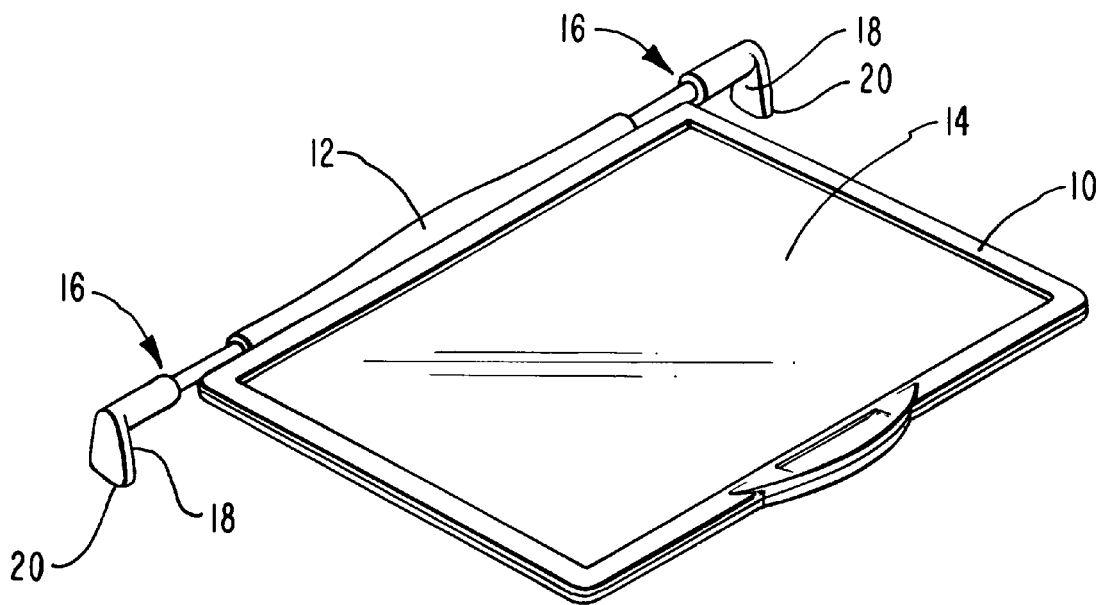
FIG. 1 is a perspective view of a notebook computer display filter having rotatable spring-loaded gripping members with the gripping members positioned in the extended position with the protrusions ready to grip the sides of a notebook computer.

Referring now to FIG. 1, a notebook computer display filter is illustrated according to the present invention. The display filter has a bezel 10 that holds a filter medium 14. The bezel 10 is the general framing means to give the filter medium 14 the ability to be mounted over a notebook computer display. Typically the filter medium 14 and the bezel 10 are substantially different materials though some implementations may be able to so construct the filter medium 14 in a manner that the bezel 10 is not necessary or is integrated therein. Furthermore, the bezel 10 can be constructed such that the filter medium 14 is selectively removable to allow changing the filter medium 14 from one type to another to get different desired filtering effects. Bezel 10 may also be designed so as to accommodate a plurality filter medium inserts, each filter medium insert having a different purpose, so that a user could combine the specific purposes of each individual filter medium insert desired to arrive at a customized overall filtering process.

Attached to the bezel 10 is a gripping member housing 12 that holds two gripping members 16. Gripping members 16 have a generally dowel-shaped body that fits within the tubular structure of housing 12 allowing the gripping members 16 to easily rotate therein. Furthermore, this particular embodiment uses a spring (not shown) to draw the gripping members 16 inward into housing 12 hence the griping members 16 are spring-loaded into the housing 12.

The gripping members 16 have protrusions 20, the protrusions 20 having an inner surface 18 for gripping the side of a notebook computer. The inner surface 18 is preferably made to enhance surface contact in order to provide a sure attachment to a notebook computer case. This may be achieved by placing soft rubber or rubber-like pads on inner surface 18, ribbing or knurling the inner surface 18, choosing the material of gripping members 16 that will secure tightly to the notebook casing, or any other way that will increase friction between the inner surface 18 and the side of a notebook computer case. The increased coefficient of friction between inner surface 18 and the notebook computer case prevents slippage and allows heavier filter media to be used than would otherwise be possible.

As shown in FIG. 1, the gripping members 16 are in an extended position in preparation for clamping onto the sides of a notebook computer. This clamping force is is provided by the spring-loaded mounting of the gripping members 16 within the housing 12. The spring-loaded gripping members 16 therefore exert sufficient force on notebook computer casing side through protrusion inner surfaces 18 to lock the display filter at a desired relative location on a notebook computer as will be explained in more detail hereinafter (see FIG. 3).

Figure 2:
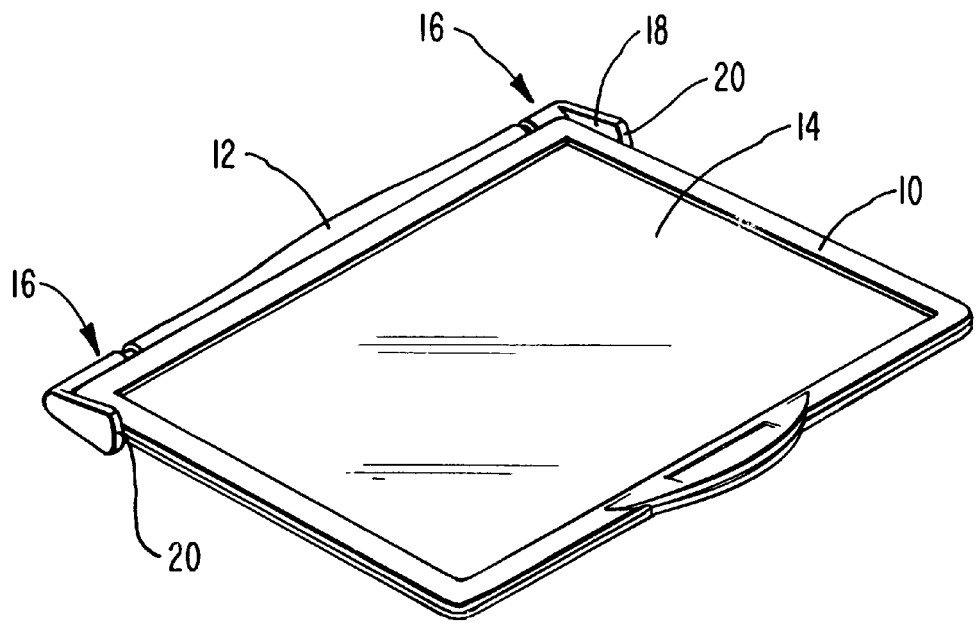
FIG. 2 is a perspective of the notebook display filter of FIG. 1 with the rotatable spring-loaded gripping members positioned in the retracted position for storage and travelling.

Since the gripping members 16 are also rotatable within the housing 12 the protrusions 20 may be oriented differently as shown in FIG. 2. By rotating the protrusions 20 downward and allowing the spring found in housing 12 to draw the gripping members 16 such that the protrusion 20 inner surfaces 18 are drawn against the sides of bezel 10, the notebook display filter is in a retracted position. With the gripping members 16 in the retracted position, the notebook display filter is in its most compact form and is ready for storage or travelling. Because the protrusions 20 have been rotated substantially in line with side of bezel 10, they now clamp against the side of bezel 10 allowing the notebook display filter to be flat thus making it highly suitable for portable applications.

Figure 3:
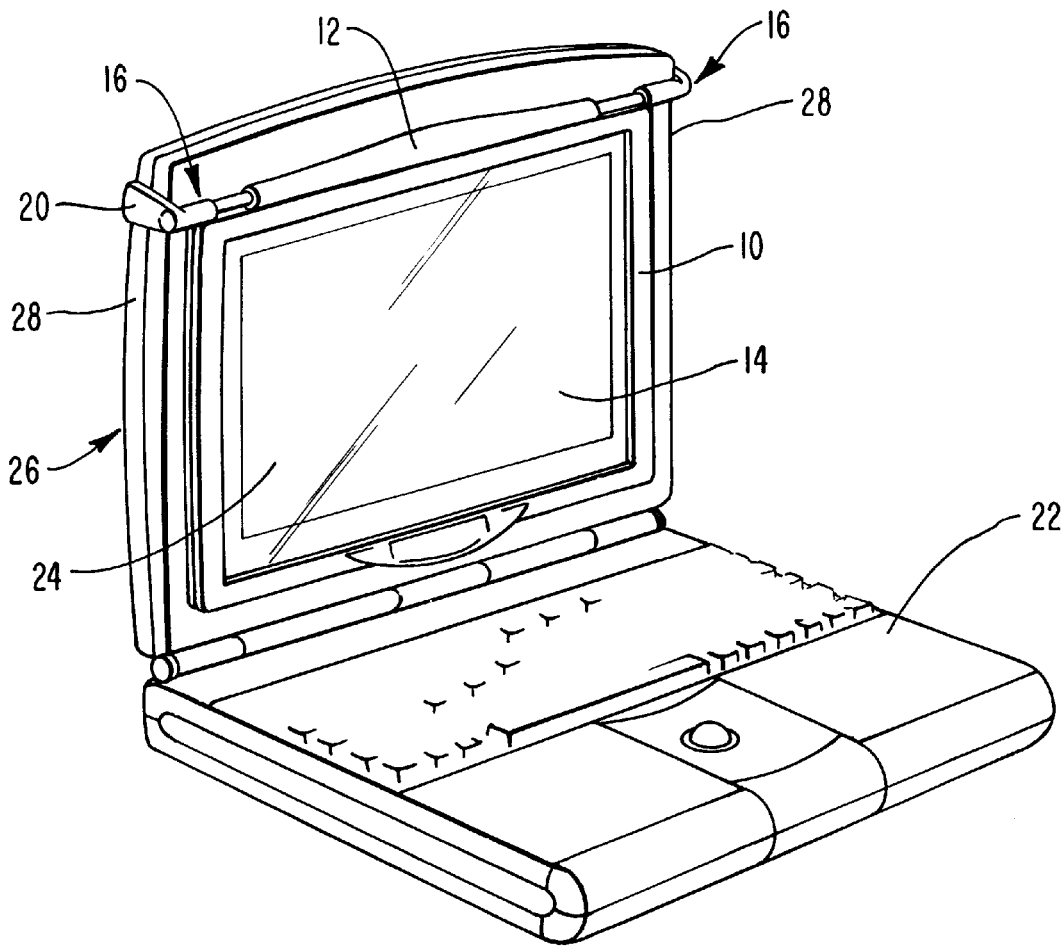
FIG. 3 is a perspective view showing the notebook and display filter of FIG. 1 attached to a notebook computer with the bezel containing the filter media centered over the notebook computer screen.

FIG. 3 shows the notebook display filter of FIG. 1 attached to a notebook computer 22 with the bezel 10 and filter medium 14 centered over a notebook computer display 24 housed within the notebook computer display case 26. The notebook computer display case 26 has sides that provide a surface for the clamping of the notebook display filter. This is accomplished through gripping members 16 being drawn into housing 12 through spring-loaded means that draws the protrusions 20 of the gripping members 16 into tight compression against the notebook computer display casing sides 28. Clamping as herein used refers to the forces exerted onto the sides of a notebook computer case that allows the notebook display filter to be affixed at a desired location with respect to a notebook computer.

Because there are many manufacturers of notebook computers and many different positions of a notebook computer display within a notebook computer display casing depending on manufacture and model, it is important that the notebook display filter be universally adaptable to these different configurations. By clamping on the sides of a notebook computer display casing, any vertical adjustment is easily made by proper placement of the notebook display filter. The notebook computer display casing sides as broadly interpreted herein are any two substantially parallel surfaces that allow clamping as shown in FIG. 3. Some configurations of notebook computer 22 may allow an embodiment of the notebook display filter to be rotated 90 degrees from that as shown in FIG. 3 so that clamping is between vertical sides.

To accomplish horizontal positioning, the housing 12 may be urged horizontally between gripping members 16 to thereby center the filter medium 14 contained within bezel 10 over the notebook computer display 24. By allowing horizontal positioning as shown, the notebook display filter may be adapted to virtually any notebook computer configuration regardless of manufacturer or model. Because of this, a notebook computer manufacturer may produce notebook display filters with regards to only the actual display size rather than all the permutations of display size combined with display positioning within a notebook computer across the multitude of different manufacturers and models.

Figure 4:
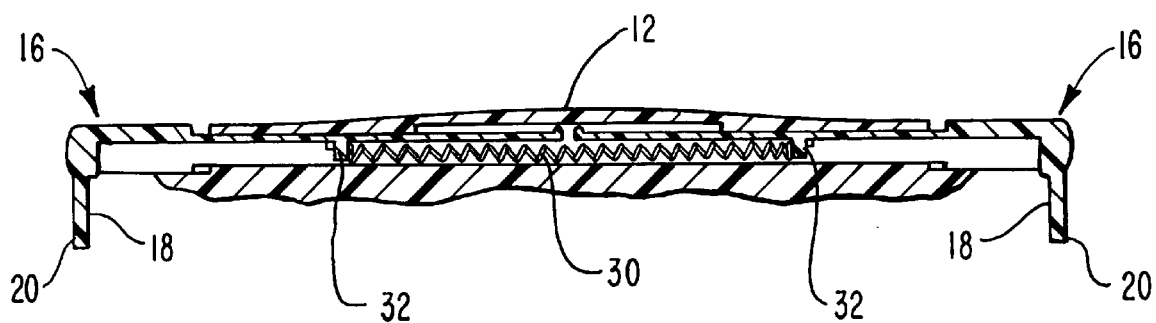
FIG. 4 is cut-away view of the notebook display filter of FIG. 1 to showing the operation of the rotatable spring-loaded gripping members within the housing attached to the bezel.

FIG. 4 shows a cut-away of the housing 12 and gripping members 16 shown in FIG. 1. Each gripping member 16 has a mounting surface 32 that allows a connection to spring 30. The spring 30 will pull each gripping member 16 into the housing 12 thereby allowing a clamping force to exist between the gripping member protrusion inner surfaces 18. It may be noted that the housing 12 may be integrated directly with bezel 10 or even part of the filter medium 14 material itself. In such a case, the bezel 10 itself would be a housing for a gripping member as herein illustrated for this embodiment or for other types of gripping members dependent upon embodiment.

Figure 5:
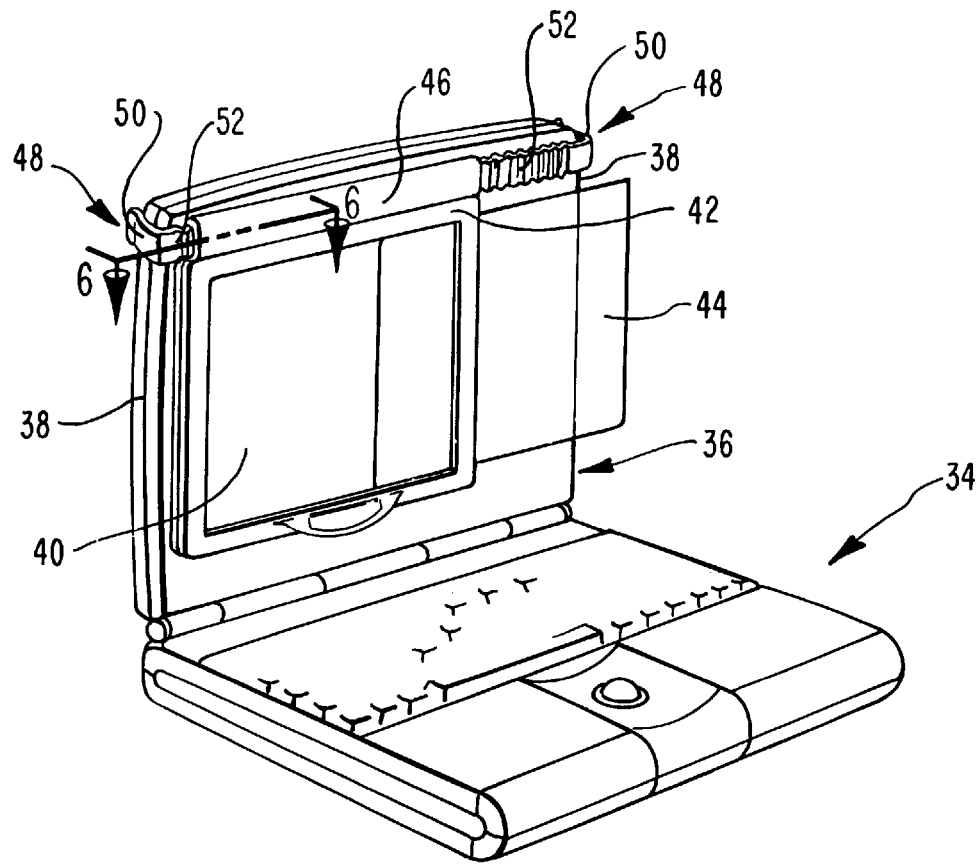
FIG. 5 is a perspective view showing a second embodiment of a notebook display filter utilizing L-shaped strip member for securement and installed on a notebook computer having a non-centered display within a notebook computer case.

FIG. 5 illustrates another embodiment of a notebook display filter and shows the notebook display filter mounted on notebook computer 34 having a display 40 that is not centered within the notebook display casing 36. In this embodiment, an L-shaped strip member housing 46 is attached to bezel 42 that holds filter medium 44. It is noted that filter medium 44 is removable and is shown partially removed in FIG. 5.

The housing 46 houses L-shaped strip members 48 and provides means for adjusting the L-shaped strip member 48 at a relative position with respect to the housing. Each L-shaped strip member 48 has an elongated portion 52 and an extended portion 50. The elongated portion 52 is drawn into and locked at a relative position within housing 46. While the extended portion 50 of each L-shaped strip member 48 is used to grip the casing sides 38. Since the L-shaped strip members 48 are locked into a rigid position within housing 46, a clip means associated with the extended portion 50 of each L-shaped strip member 48 provides the clamping forces to hold the entire notebook display filter onto the notebook computer display casing sides 38.

To properly use the embodiment of the notebook display filter shown in FIG. 5, a user will adjust the L-shaped strip members 48 so that the extended portions 50 span a distance that is very close to the overall width of the notebook computer display case 36 and will position the bezel 42 and removable filter medium 44 over the notebook computer display 40. At this point, the user will simply snap the entire notebook display filter onto the notebook computer display casing 36.

Figure 6:
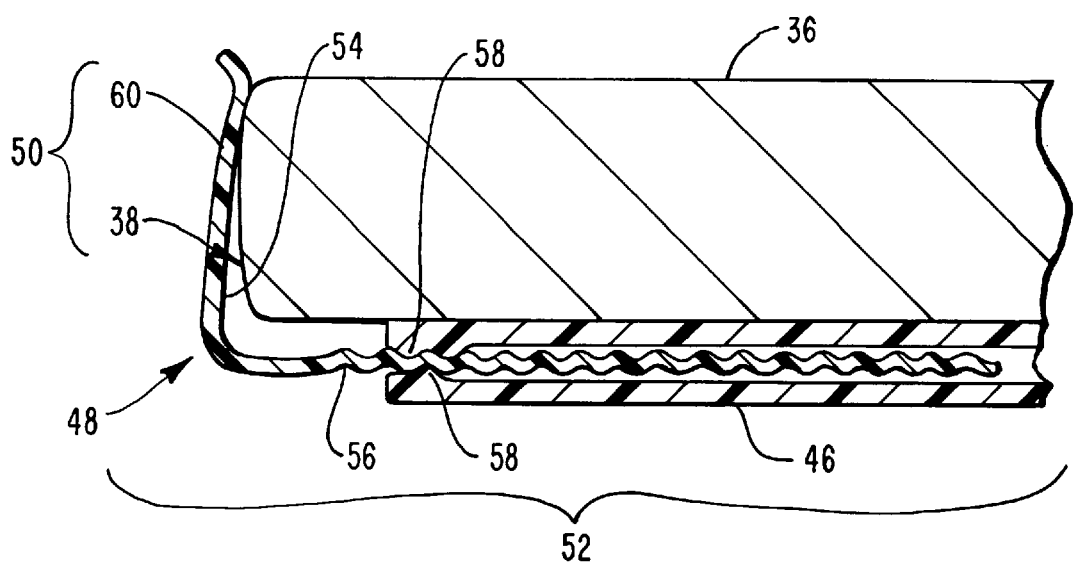
FIG. 6 is a cut-away view of the notebook display filter of FIG. 5 while installed showing the operation of an L-shaped strip member within the display filter housing as well as well as the operation of the clip portion.

FIG. 6 shows a cut-away view of an L-shaped strip member 48 locked within housing 46 and clamped around the notebook display casing 36. The extended portion 50 of the L-shaped strip member 48 forms a clip 60 having an inner surface 54 for engaging the side 38 of computer casing 36. The L-shaped strip member 48 is preferably constructed of metal or other material capable of resilient movement. The clip 60 will be stretched from its normal resting state to its clipped state by pressing it onto the side 38 of the notebook computer display casing 36. The natural tendency of the clip 60 to return to its resting state will exhibit the clamping forces necessary to maintain the entire notebook display filter at the desired position. Furthermore inner surface 54 of clip 60 may have rubberized material, an abrasive substance, or other means for more surely gripping the side 38 of the notebook computer display casing 36. Having clip 60 formed in the extended portion 50 of L-shaped strip member 48 provides a very convenient and effective method of attaching the notebook display filter onto a notebook computer.

Also shown in FIG. 6 is the means for adjusting the L-shaped strip member 48 with respect to housing 46. On the elongated portion 52 of the L-shaped strip member 48 are strip member serrations 56. Likewise in the housing 46 are mating housing serrations 58. It is noted that the length of the elongated portion 52 of L-shaped strip member 48 within housing 46 is able to move slightly from side to side. This slight movement allows a user to adjust the L-shaped strip member 48 to the desired location within the housing 46 by allowing movement between the mating serrations.

Once the L-shaped strip member 48 is clipped into place on the notebook computer display casing 36, no movement of the elongated portion 52 will be possible and therefore no danger exists of losing the desired fixed position of the L-shaped strip member. The pressure exerted by the clip 60 will stop all movement of the elongated portion 52 within housing 46.

It will be clear to those skilled in the art that numerous other ways of achieving a clamping means on the sides of a notebook computer are possible. These all are contemplated within the scope of this invention as long as the overall concepts of adjustability between differing configurations of notebook computers and placement of clamping means on the notebook computer case sides are maintained.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A display filter for a portable, laptop or notebook computer having a substantially flat display housed in a casing having sides that are substantially normal to the computer display, the display filter comprising:

a filter medium;

frame means for supporting the filter medium;

clamping means for selectively clamping the sides of the computer display casing, said clamping means comprising a horizontally movable housing, said housing being coupled to said frame means to thereby allow horizontal adjustment of the frame means to center the filter medium over the display.

2. A display filter as recited in claim 1 wherein the clamping means comprise rotatable gripping members.

3. A display filter as recited in claim 1 wherein the filter medium is selectively placeable and replaceable within the frame means.

4. A filter as recited in claim 1 wherein the clamping means comprises first and second spring-loaded gripping members having protrusions for selectively and adjustably engaging the casing sides.

5. A display filter as recited in claim 1 wherein the clamping means comprises first and second L-shaped members, said L-shaped members having an elongated portion and an extended portion, the elongated portion of the L-shaped members for selective and adjustable engagement with the frame means and the extended portion of the L-shaped members for engaging the casing sides.

6. A display filter as recited in claim 1 wherein the clamping means comprises first and second L-shaped members, said L-shaped members having an elongated portion and an extended portion, the elongated portion of the L-shaped members for selective and adjustable engagement with the frame means and the extended portion of the L-shaped members for engaging the casing sides, the extended portion further comprising curved clip means to more securely engage the casing sides.

7. A filter bezel securement apparatus for securing and centering a bezel over a display, the bezel capable of holding a filter medium, the display being substantially flat, and the display placed within a display casing having at least two display casing sides substantially normal to the display and oriented in parallel with respect to each other, the bezel securement apparatus comprising:

an elongated housing integral with one side of the bezel, the housing having two opposed ends, each end able to receive and adjustably retain a casing side gripping member;

a first casing side gripping member, the first gripping member having a protusion for gripping a first display casing side and the first gripping member adjustably engaged to the housing;

a second casing side gripping member, the second gripping member having a protrusion for gripping a second display casing side that is oriented in parallel with respect to the first display casing side, and the second gripping member adjustably engaged to the housing; and the first and second gripping members adapted to exert sufficient force on the respective display casing sides to hold the bezel and any associated filter at a desired location, the housing adapted to be horizontally movable with repsect to said first and second gripping members and placed on the display casing such that the bezel is ceneterd over the display.

8. A filter bezel securement apparatus as recited in claim 7 wherein the first and second gripping members are rotatable within the housing.

9. A filter bezel securement apparatus as recited in claim 7 wherein the first and second gripping members are held within the housing by spring means, the spring means also providing the adjustable engagement of the gripping members and the force exerted on the casing sides.

10. A filter bezel securement apparatus as recited in claim 7 wherein the first and second gripping members each comprises an L-shaped strip member, the elongated portion of the strip member fitting within the housing and the extended portion the strip member being the protrusion for gripping the casing sides.

11. A filter bezel securement apparatus as recited in claim 7 wherein the first and second gripping members each comprises an L-shaped strip member, the elongated portion of the strip member fitting within the housing and the extended portion of the strip member being the protrusion for gripping the casing sides, the extended portion further having curved clip means to securely locking against a casing side.

12. A quadrangular display filter centered over a quadrangular notebook computer display, the display being substantially flat, and the display placed within a display casing having at least two display casing sides substantially normal to the display and oriented in parallel with respect to each other, the display filter comprising:

a filter medium;

a filter medium bezel for holding the filter medium;

an elongated housing integral with one side of the bezel, the housing having two opposed ends, each end able to receive a casing side gripping member;

a first casing side gripping member, the first gripping member having a protrusion for gripping a first display casing side and the first gripping member adjustably engaged to the housing;

a second casing side gripping member, the second gripping member having a protrusion for gripping a second display casing side that is oriented in parallel with respect to the first display casing side, and the second gripping member adjustably engaged to the housing; and the first and second gripping members adapted to exert sufficient force on the respective display casing sides to hold the bezel and any associated filter medium at a desired location, the housing adapted to be horizontally movable with respect to said first and second gripping members and placed on the display casing such that the filter medium is centered over the display.

13. A display filter as recited in claim 12 wherein the first and second gripping members are rotatable within the housing.

14. A display filter as recited in claim 12 wherein the first and second gripping members are held within the housing by spring means, the spring means also providing the adjustable engagement of the gripping members and the force exerted on the casing sides.

15. A display filter as recited in claim 12 wherein the first and second gripping members each comprises an L-shaped strip member, the elongated portion of the strip member fitting within the housing and the extended portion of the strip member being the protrusion for gripping the casing sides.

16. A display filter as recited in claim 12 wherein the first and second gripping members each comprises an L-shaped strip member, the elongated portion of the strip member fitting within the housing and the extended portion of the strip member being the protrusion for gripping the casing sides, the extended portion further having curved clip means to securely locking against a casing side.

* * * * *